Patented Aug. 30, 1949

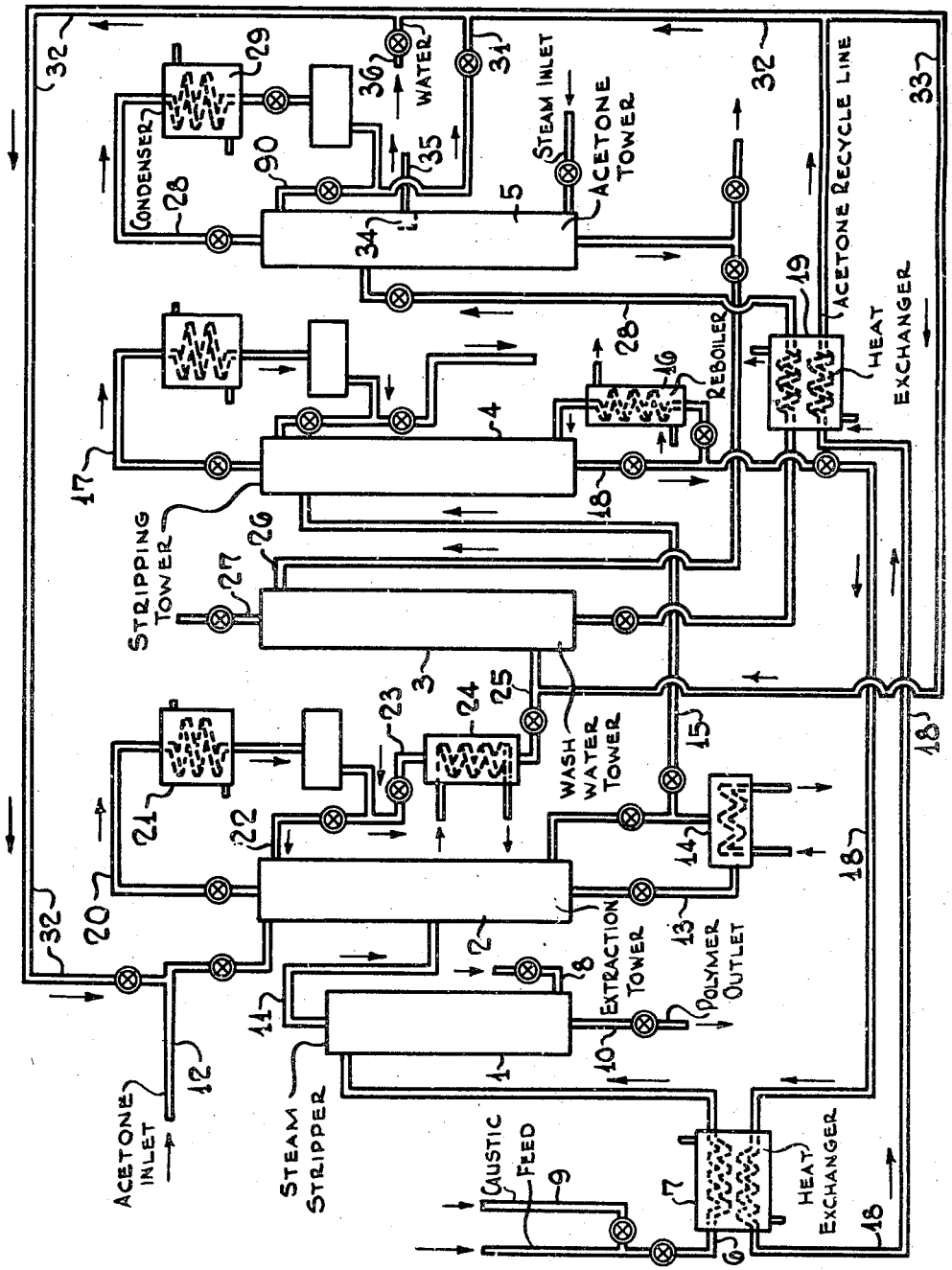

2,480,652

UNITED STATES PATENT OFFICE 2,480,652

EXTRACTIVE DISTILLATION OF ALCOHOL-HYDROCARBON MIXTURES

Charles A. Hillman, Maplewood, and John D. Long and Arthur K. Scott, Westfield, N. J., assignors to Standard Oil Development Company, a corporation of Delaware Application June 29, 1944, Serial No. 542,754

3 Claims. (Cl. 202—39.5)

This invention relates to a method of separating hydrocarbons, and more particularly, to a process for the extractive distillation of paraffins from olefins employing a solvent in the liquid phase whereby the olefins are concentrated in the residue.

It is known to separate various hydrocarbon mixtures by fractionally distilling the mixture in the presence of a solvent under temperature and pressure conditions wherein the bulk of the solvent is maintained in the liquid phase. In such a process those constituents more readily soluble in the particular solvent used are concentrated in the residue and the remaining constituents are removed as a raffinate fraction. The solvent is separately removed from both the extract and raffinate fractions, the separately recovered portions combined and recycled together to the extraction step.

In many cases the hydrocarbon feed to the extraction tower contains a small amount of high boiling materials, alcohols and esters, particularly if the feed has been obtained from a cracking process wherein a large amount of unsaturated hydrocarbons are formed and subsequently subjected to a sulfuric acid extraction for removal of certain unsaturated constituents. This high boiling material dissolves in many types of solvents used, and consequently is removed from the bottom of the extraction tower along with the desired components in the extract. When these desired components are separated from the solvent, the high boiling material remains dissolved in the solvent and is consequently recycled back to the extraction tower along with the solvent. Thus, it is obvious that the concentration of high boiling material in the solvent being circulated will build up. Such a condition is undesirable both from the standpoint of difficulty of control and because it requires an increase in solvent circulation to offset the bed effect of the high boiling material on the relative volatilities of the components which it is desired to separate.

If the polymers in the feed to the extractive distillation tower were not kept at a maximum of 0.1 per cent, the subsequent equipment would become so large as to be both impractical and uneconomic. This is due to the fact that with a larger amount of polymer entering the system and being absorbed in the solvent, the selectivity of the solvent decreases, necessitating both a larger amount of solvent to accomplish the desired hydrocarbon separation and an increase in the amount of solvent which must be bled from the main stream for polymer removal by water washing. Both of these effects introduce a very undesirable process condition requiring a large increase in equipment throughout the plant.

This invention, therefore, has for its principal object to provide for an economical process for separating hydrocarbon mixtures by extractive distillation in the presence of a solvent and under temperature and pressure conditions in which the solvent is maintained essentially in the liquid phase while preventing an increase in concentration of high boiling material in the solvent being recycled.

It is a further object of this invention to provide a method for reducing the amount of equipment necessary for the recovery of the solvent.

In the process for the manufacture of butadiene, it is desirable to concentrate normal butenes after the isobutylene has been removed by acid extraction. This concentration may be accomplished by an extractive distillation using aqueous acetone or furfural. However, if the feed to the extractive distillation tower contains an appreciable amount of polymeric material produced in the acid extraction process, this material will build up in the solvent and require a rather costly procedure to remove it.

It is the purpose of the present invention, therefore, to combine a polymer rerun tower with an extractive distillation unit so as to reduce the amount of polymer in the extractive distillation tower feed to a certain maximum value. It has been found that the economic limit with regard to content of high boiling material in the feed stock is 0.1% by weight. The present invention, therefore, proposes a polymer rerun tower designed to reduce the polymer concentration in the overhead to below a minimum of 0.1%. It is a further part of the invention to deliver the feed to the extractive distillation tower as a vapor directly from the polymer rerun tower without intermediate condensation, thus securing considerable economies in both materials and money.

The accompanying drawing is a front elevation in diagrammatic form of a plant suitable for carrying out the process according to the present invention. The plant illustrated is adapted for the operation of the process of the present invention in its preferred embodiment. It will be understood from the description of this plant that various changes may be made therein to modify the process as described without departing from the spirit and scope of this invention.

With reference to the drawing, 1 represents a polymer rerun tower for separating the principal stock from the bulk of the high boiling materials by a steam distillation. The purified feed stock is distilled in tower 2 in the presence of a liquid solvent to yield vapor and liquid fractions which are removed from the top and bottom of the tower respectively. This extractive distillation may be carried out in any known suitable type of fractionating column whether it be a tower filled with a packing of refractory earthware, glass, etc., or a tower constructed in the same manner as an ordinary fractionating column of the bubble cap type. In any case, the feed enters the tower in vapor form and is passed upwardly through the liquid phase selective solvent flowing down the tower.

Conditions on each plate of the tower are such that the liquid mixtures of close boiling hydrocarbons and solvent are at their boiling points and are continuously being contacted with vapors boiled from the plates below. Because of the relatively low volatility of the solvent compared with the hydrocarbon constituents, the vapors are relatively poor in the former constituents and rich in the latter. By holding the amount of solvent circulated to the tower constant in definite ratio to the amount of reflux returned to the tower, the optimum relative volatilities for the separation of the desired hydrocarbons can be secured. Furthermore, by controlling the amount of hydrocarbon reflux and consequently the reflux ratio, the actual degree of separation may be varied until the desired product purity and recovery are obtained. Solvent is recovered from the overhead fraction in tower 3 and from the bottoms fraction in tower 4. Dilute solvent obtained in tower 3 is concentrated in tower 5 and recycled to the extraction tower 2.

The invention will be described in detail as applied to the separation of a mixture of butanes and butenes contained in the $C_4$ fraction obtained by the cracking of a gas oil. However, it should be understood that the invention applies as well to a $C_5$ fraction or to the separation of any other mixture containing constituents having closely related boiling points but differing in their solubility in a suitable solvent. Such a $C_4$ fraction contains isobutylene, butene-1, butenes-2, butane, isobutane, and small amounts of diolefins and acetylenes. The isobutylene present in this fraction is an important raw material for the preparation of high molecular weight polymers, synthetic rubber and butyl alcohols. This material is usually removed from the $C_4$ fraction by contacting the fraction with sulfuric acid of the desired concentration whereby substantially only the isobutylene is absorbed in the acid. As a result of acid-treating the $C_4$ fraction in this manner, a portion of the isobutylene and other olefins present is polymerized and gives rise to the formation of a small amount of a high boiling material which remains dissolved in the remaining hydrocarbons.

A $C_4$ fraction of this type from which the bulk of the isobutylene has been removed by extraction with sulfuric acid and which has, for example, the following composition is suitable as a feed stock for the process according to this invention:

| | Per cent by volume |
|---|---|
| Isobutane | 42.4 |
| Normal butane | 9.4 |
| Isobutylene | 2.0 |
| Butene-1 | 15.0 |
| Butenes-2 | 30.2 |
| High boiling material alcohols and esters | 1.0 |

Referring to the drawing, this fraction is introduced by line 6 through heat exchanger 7 into tower 1 where it is distilled with steam introduced through line 8. Caustic may also be introduced into this tower through line 9 to neutralize any sulfuric acid esters which may be present as a residue from acid-treating. High boiling materials, esters, water and caustic, are withdrawn from the bottom of tower 1 through line 10. The hydrocarbons from which all but a trace of the high boiling materials have been removed are taken overhead through line 11 and are introduced in the vapor phase into tower 2 where they are subjected to an extractive distillation in the presence of a liquid stream of aqueous acetone introduced through line 12. The conditions in the tower are such as to cause a distillation of hydrocarbons in the presence of aqueous acetone on each plate of the tower. The aqueous acetone contains 10–17% water. Suitable temperatures range between 120° and 200° F. and pressures between 50 and 150 lbs. In this manner, the butanes and butenes are simultaneously distilled and extracted as they pass through the acetone. Heat may be supplied to tower 2 by means of reboiler 14.

Although the distillation of the feed in tower 1 results in the removal as bottoms of substantially all of the high boiling material from the feed, a small amount of butyl alcohol may be taken overhead with the distilled feed. The butyl alcohol may be present as a byproduct of a preceding extraction of isobutylene from the stock, or formed by hydrolysis of esters in tower 1. This butyl alcohol is soluble in the acetone and remains in the extract.

Extract (including solvent) is removed from the bottom of the tower through line 15 and has the following approximate composition in weight per cent when the extractive distillation tower is operated with 85 weight per cent solvent on the top extraction plate and a cold hydrocarbon reflux ratio (to overhead product) of 6.5:1:

| | Per cent |
|---|---|
| $C_4$ hydrocarbons (95% butenes) | 4.1 |
| Acetone | 78.4 |
| Water | 16.5 |
| High boiling materials (including butyl alcohol) | 1.0 |

The extract is then introduced into tower 4 where the butenes are separated from the aqueous acetone using fractionation by distillation in the conventional manner. For example, the bottom of the stripping tower 4 may be heated by reboiler 16 which may be a fired coil or steam heater, while the top of the tower is refluxed by returning a portion of the solvent-free product butenes removed from the top of the tower through line 17. These butenes have approximately the composition:

| | Per cent |
|---|---|
| Butene-1 | 26.7 |
| Butenes-2 | 63.5 |
| Isobutane | 1.8 |
| Normal butane | 4.4 |
| Isobutylene | 3.6 |

Aqueous acetone from which all of the $C_4$ hydrocarbons have been removed but which contains any high boiling materials including butyl alcohol, is taken from the bottom of tower 4 through line 18, passed through heat exchangers 7 and 19 and further treated in a manner to be described hereinafter.

Returning now to the extraction tower 2, the butanes are removed overhead through line 20 and condensed in condenser 21. The condensate formed has the following composition in weight percent:

| | Per cent |
|---|---|
| C$_4$ hydrocarbons (92% butanes) | 95 |
| Acetone | 4 |
| Water | 1 |

A portion of this condensate may be returned to the tower through line 22 as reflux while the remainder is passed through line 23 and cooler 24 and introduced into the bottom of water wash tower 3. In this tower the acetone is removed from the butane fraction by washing with water introduced at the top of the tower through line 26. Butanes from which essentially all of the solvent has been removed are taken overhead through line 27 and are thence conveyed to storage. These butanes have the following approximate composition:

| | Per cent |
|---|---|
| Isobutane | 78.0 |
| Normal butane | 13.9 |
| Isobutylene | 0.6 |
| Butene-1 | 5.9 |
| Butenes-2 | 1.6 |

The washing of the butane fraction with water as carried out in this tower may be accompanied by severe emulsification unless the concentration of acetone in the water is controlled. It is therefore necessary to adjust the amount of water introduced through line 26. Satisfactory operation has been obtained with an acetone concentration in the water phase in the range of 15–25%.

Aqueous acetone accumulates in the bottom of water wash tower 3 and is removed through line 28, passed through heat exchanger 19, and introduced near the top of tower 5 where the acetone is concentrated to a point where it is suitable for use as a solvent in the extractive distillation tower 2. This tower is also provided with trapout tray 34 for removing butyl alcohol as described below.

The thus concentrated acetone, usually a mixture of 83 weight per cent acetone and 17% water, is removed overhead from tower 5 through line 28 and condensed in condenser 29. A part of the condensed acetone may be returned to tower 5 as reflux and the remainder is removed through line 31 and combined with the acetone from the bottom of tower 4. This combined stream of acetone is then recycled to the extraction tower 2 through line 32. The strength of the concentrated acetone may be varied to maintain a desired composition of the main body of solvent or to facilitate withdrawal of an alcohol-rich sidestream.

The acetone recovered from the butene fraction in tower 4 contains butyl alcohol formed as a by-product of isobutylene extraction with sulfuric acid or formed by later hydrolysis of the esters from such extraction and which was not removed from the feed to the extraction tower 2 as explained above. It is obvious if the acetone containing the alcohol is allowed to circulate continuously that the amount of alcohol in the acetone will continually increase and finally overload the system.

According to this invention, the butyl alcohol is prevented from building up in the circulating acetone by bleeding off a portion of the acetone from line 18 and introducing it through line 33 into the butane stream being removed from the top of extraction tower 2 into the bottom of water wash tower 3. In this tower, during the extraction of the acetone from the liquid butanes by means of the water, the butyl alcohol present in the acetone is also partially extracted by the water and is introduced into tower 5 where it accumulates as an azeotrope with water about midway of the tower, due to the fact that the azeotrope has a boiling point midway between acetone and water. Accordingly trapout tray 34 is provided for withdrawing a sidestream through line 35 consisting of the azeotrope of butyl alcohol with water. In order to prevent any substantial amount of acetone being removed along with this side stream, it is necessary to take off a highly concentrated acetone overhead from tower 5. Consequently, it is necessary to add sufficient water to the acetone recycled through line 32, for example through line 36. Also any high boiling hydrocarbons not removed in polymer rerun tower 1, dissolve in the butane and are removed along with the butane to storage through line 27. Thus a portion of the butyl alcohol and of any high boiling hydrocarbons contained in the circulating acetone are being continually removed.

While this invention has been particularly described with relation to the treatment of a mixture of hydrocarbons consisting principally of butanes and butenes using aqueous acetone as the separating agent, it should be noted that this invention may also be applied to other types of separation and is useful in any situation in which a separating agent, which is a preferential solvent for one constituent or a group of constituents, is used during the distillation of the said mixture whether the process is operated to produce substantially pure constituents or not. The process is especially useful in separating between constituents having closely related boiling points but which contain a small amount of a constituent boiling at a materially higher temperature. This invention is therefore to be construed broadly to include all forms of extractive distillation as described in the specification. Among types of separating agents which may be used besides acetone are dioxane, nitrobenzene, benzonitrile, monochloracetonitrile, phenyl thiocyanate, phenolthiocyanate, formate of pyridine, benzaldehyde, furfural, furfuryl alcohol, chlorisopropyl alcohol, diacetone alcohol, methyl alcohol, ethyl alcohol, aniline, methyl lactate, triacetin, diacetin, methyl nitrobenzoate, formic acid, acetic acid, ethylenechlorhydrin, glycol monoacetate, glycol diacetate, lactic acid nitrile, toluidine, chlorpyridine, beta-beta-dichlorethyl ether, chloraniline, quinoline, isoquinoline, pyridine, chlorophenol, etc.

The nature and objects of the present invention having thus been set forth and a specific illustrative embodiment of the same given, what is claimed as new and useful and desired to be secured by Letters Patent is:

1. A process for separating and recovering olefin and paraffin hydrocarbons from a mixture of hydrocarbons which contain higher boiling materials, including butyl alcohol and butyl sulphate resulting from sulfuric acid treatment to remove isobutylene, which comprises subjecting the acid-treated mixture to steam distillation to remove the higher boiling material, including a portion of the butyl alcohol present in the feed or subsequently formed by hydrolysis of butyl sulfate, fractionating the steam distilled mixture containing the butyl alcohol not removed in the steam distillation, in the presence of a selective solvent under temperature and pressure conditions such that the solvent remains essentially in the liquid phase, removing a vapor fraction comprising principally paraffin hydrocarbons and a small amount of solvent, removing a liquid fraction comprising principally olefin hydrocarbons, the bulk of the solvent and the butyl alcohol in the steam distilled mixture, recovering solvent from the liquid fraction, condensing the vapor fraction, mixing with the condensed vapor fraction a minor portion of the solvent containing butyl alcohol recovered from the liquid fraction, recovering the solvent from the vapor fraction by extracting with water, concentrating the solvent by fractionation, and recovering butyl alcohol as a side stream in said fractionation.

2. A process for separating and recovering olefin and paraffin hydrocarbons from a mixture of hydrocarbons which contain higher boiling materials including alcohols and alkyl sulfates resulting from sulfuric acid treatment, which comprises subjecting the acid-treated mixture to steam distillation to remove the higher boiling material, including a portion of the alcohols present in the feed or subsequently formed by hydrolysis of alkyl sulfates, fractionating the steam distilled mixture containing the alcohols not removed in the steam distillation, in the presence of a selective solvent, under temperature and conditions such that the solvent remains essentially in the liquid phase, removing a vapor fraction comprising principally paraffin hydrocarbons and a small amount of solvent, removing a liquid fraction comprising principally olefin hydrocarbons, the bulk of the solvent and the alcohols in the steam distilled mixture, removing solvent from the liquid fraction, condensing the vapor fraction, mixing with the condensed vapor fraction a minor portion of the solvent, containing alcohols recovered from the liquid fraction, recovering the solvent from the vapor fraction by extracting with water, concentrating the solvent by fractionation and recovering alcohols during said fractionation as water azeotropes.

3. The process as described in claim 1, wherein said olefin and paraffin hydrocarbons are butanes and butenes, and wherein said selective solvent is a liquid water-soluble polar organic solvent.

CHARLES A. HILLMAN.
JOHN D. LONG.
ARTHUR K. SCOTT.

REFERENCES CITED

The following references are of record in the file of this patent:

UNITED STATES PATENTS

| Number | Name | Date |
| --- | --- | --- |
| 2,212,810 | Field | Aug. 27, 1940 |
| 2,288,126 | Dunn et al. | June 30, 1942 |
| 2,357,344 | Morris | Sept. 5, 1944 |
| 2,362,052 | Craig | Nov. 7, 1944 |
| 2,366,362 | Semon | Jan. 2, 1945 |
| 2,377,049 | Souders | May 29, 1945 |

FOREIGN PATENTS

| Number | Country | Date |
| --- | --- | --- |
| 548,734 | Great Britain | Oct. 22, 1942 |